United States Patent [19]

Perrault et al.

[11] Patent Number: 5,350,141
[45] Date of Patent: Sep. 27, 1994

[54] VERSATILE SUPPORT APPARATUS

[76] Inventors: Frederick Perrault, 1727 Date Ave., Torrance, Calif. 90503; Raymond E. Perrault, 3845 E. Crest Rd., Rancho Palos Verdes, Calif. 90274

[21] Appl. No.: 33,042

[22] Filed: Mar. 18, 1993

[51] Int. Cl.5 ............................................. E21F 17/02
[52] U.S. Cl. ....................................... 248/59; 248/327
[58] Field of Search ..................... 248/59, 62, 327, 58, 248/317; 403/375, 408.1

[56] References Cited

U.S. PATENT DOCUMENTS

| | | |
|---|---|---|
| 1,362,244 | 12/1920 | Farley . |
| 2,339,565 | 1/1944 | Goldberg et al. . |
| 3,273,837 | 9/1966 | Wilbert et al. . |
| 3,334,851 | 8/1967 | Cassidy et al. . |
| 3,355,132 | 11/1967 | Jenkins . |
| 3,506,227 | 4/1970 | Jenkins ................... 248/59 |
| 3,517,901 | 6/1970 | Jenkins ................... 248/59 |
| 3,528,634 | 9/1970 | Jenkins . |
| 3,559,910 | 2/1971 | Babb ....................... 248/59 |
| 3,565,375 | 2/1971 | Babb ....................... 248/59 |
| 3,575,367 | 4/1971 | Welsh et al. ............. 248/59 |
| 3,866,871 | 2/1975 | Dupuy, Sr. .............. 248/59 |
| 4,915,534 | 4/1990 | Richards ................. 403/189 |
| 4,960,253 | 10/1990 | Perrault et al. .......... 248/68.1 |
| 5,088,675 | 2/1992 | Perrault et al. .......... 248/59 X |
| 5,160,107 | 11/1992 | Perrault et al. .......... 248/59 X |
| 5,221,064 | 6/1993 | Hodges .................... 248/59 |

FOREIGN PATENT DOCUMENTS

| | | |
|---|---|---|
| 445970 | 3/1968 | Fed. Rep. of Germany . |
| 434681 | 9/1926 | Netherlands . |
| 3309758 | 3/1983 | United Kingdom . |

*Primary Examiner*—Ramon O. Ramirez
*Attorney, Agent, or Firm*—Poms, Smith, Lande & Rose

[57] ABSTRACT

A versatile support apparatus and method primarily for use aboard ships includes a stud welded to an overhead deck plate or to a vertical bulkhead or side wall of the ship. Securing to the stud and extending to the article supported is an elongate support assembly including a bracket portion supportingly engaging the article. The support assembly includes a bolted joint providing for large scale adjustment of the length of the support assembly, and of the position of the article supported. Also, the support assembly includes a threaded join providing fine-dimension adjustment of the support assembly. The support assembly is of simplified construction, is economical to make and install, maintains its large scale and fine-dimension adjustments once installed, allows easier maintenance of suspended articles in the usually crowded shipboard environment, and is very versatile in its application. Consequently, the support apparatus and method of the present invention reduces construction and maintenance costs for ships.

12 Claims, 4 Drawing Sheets

VERSATILE SUPPORT APPARATUS

BACKGROUND OF THE INVENTION

In the construction of ships, it is usual to suspend ducts, pipes, wireways, light fixtures, and other items of equipment from the deck above, or from other overhead supporting surfaces, as well as to provide lateral support for some of these items of equipment from vertical bulkheads of the ship. Thus, vertical support for the item of equipment is provided by the overhead structure while lateral support is derived from the vertical bulkheads. In order to suspend the item of equipment the area desired, it is usual to employ a vertical downcomer of channel, angle, or tubular configuration, for example, which is cut to length and welded both to the overhead support and to the pipe or duct. Similarly, lateral support is usually provided by using a piece of similar material extending angularly between The duct pipe and the nearby vertical surfaces of a bulkhead. Again this lateral supporting member is cut to length and welded in place.

The long-accepted way of securing ducts: pipes, and other equipment in ships is very time-consuming, and requires the use of expensive and heavy welding equipment. During the construction of a ship, merely moving the heavy welding equipment from place to place in the construction environment of the ship is a great burden. Each support member must be measured and cut to length. Beyond the burden of time and effort needed to take the many measurements for the support members, to cut these support members, and to transport all these cut support members their place of installation, in the event that a mistake is made in measurement or cutting so that the support members are cut to the wrong length, additional waste labor, time and materials results.

Further to the above, it frequently is desirable to make fine-dimension adjustments in the vertical or lateral position of suspension for a duct or pipe in a ship. These adjustments may be desirable, for example, to line up successive lengths of a duct or pipe with one another, or to align such a duct or pipe run with a bulkhead opening. Understandably, plural fine-dimension adjustments of position along the length of a long pipe or duct can ease many alignment problems as successive sections of the duct or pipe run are installed. Understandably, misalignments can tend to be cumulative along a long length of duct or pipe run. In some cases, such adjustment is more than desirable, but is essential to correct gross misalignments or to avoid an interference of the pipe or duct with other immovable structure of the ship. The conventional welded support method of suspending such ducts and pipes makes such adjustments impossible. Consequently, when a situation of gross misalignment is encountered, drastic and expensive remedies are often required. In fact, on occasions of a gross misalignment of a pipe or duct with conventional welded supports, cutting loose previous welds and support members, and jacking or otherwise rigging the pipe or duct, back along its length, for example, could be required. On such an occasion, it is easy to imagine the cutting, rework and rewelding that might be required if such a remedial expedient is employed. The inefficiency, expense, and risk of very expensive rework in a construction environment presented by the conventional welded support suspension system for pipes and ducts makes this old technology undesirable.

SUMMARY OF THE INVENTION

In view of the above, the present invention provides a versatile method and apparatus for supporting pipes, ducts, and other structure in a ship, which apparatus and method avoids the use of heavy conventional welding equipment, allows bolted assembly of downcomers and lateral support members or braces with only minimal welding required on site, and also allows for both large scale and fine-dimension adjustment of the support members and the suspended pipe, duct, or other structure.

More particularly, the present invention provides an improved support for use aboard ships, which is of simplified design, is lightweight, economical to maker and is easy to install. Moreover, the support is strong, rigid, and provides both for large scale and fine-dimension adjustments of the item supported.

The support of the present invention is adapted to make use of a stud which is welded to the overhead ship deck or to the vertical surface of a bulkhead to extend generally perpendicularly therefrom. The stud may be any of at least two different designs. One design of the stud includes a cylindrical end portion which is welded to the ship structure. The other end portion of the stud includes a prismatic body which is generally rectangular in side view, and is of square cross section with rounded corners. The prismatic end portion defines at least one transverse fastener hole opening on opposite side surfaces thereof. The other design of stud includes a cylindrical body which at one end is welded to the deck or bulkhead. The other end portion of the stud defines a thread. Threadably received upon the threaded portion of the stud is a tubular end portion of an adaptor which, similarly to the prismatic portion of the first stud design, at its opposite end portion defines at least one transverse fastener hole.

Bolted to the prismatic portion of the first stud design, or to the adaptor threaded onto a stud of the second design, is an elongate support member extending toward the duct, pipe, or other member to be supported. At its end engaging the stud or adaptor, the elongate support member is angle or channel-shaped to provide good rigidity and light weight. This angle or channel-shaped portion of the elongate support member also defines plural through fastener holes spaced along its length and by which the support member may be bolted to the stud or adaptor. The spacing of these fastener holes provides for large scale incremental adjustment of the supported item.

In the case of a support member bolted to a stud of the first design, the other end of the elongate support member is itself tubular and defines an axial bore with a screw thread therein. Threadably received into this bore of the support member is a stem portion of a bracket member. The bracket member is of angle shape with one leg carrying the stem and the other leg extending laterally and defining plural spaced fastener holes. These latter fastener holes may be used to attach the bracket member to a flange of a duct, for example, which is to be supported by the present inventive support apparatus. Relative rotation of the elongate member and bracket provides fine-dimension incremental position adjustment of the bracket member and duct relative to the deck or bulkhead to which the stud of first design is welded.

In the case of an elongate member which is bolted to an adaptor threadably securing to a stud of the second design, relative rotation of the adaptor on the stud provides for fine-dimension incremental adjustment, while the selection of one of the plural holes in the angle or channel-shaped portion of the elongate member for receiving a fastener passing through the at least one fastener hole of the adaptor provides large scale incremental position adjustment. In this case, the elongate support member may be channel or angle-shaped throughout its entire length.

At its end opposite the adaptor, the channel or angle-shaped elongate support member may alternatively carry a pipe bracket welded thereto and by which a pipe may be supported, or may bolt to a duct bracket. The duct bracket includes a cylindrical portion defining at least one transverse fastener hole by which the duct bracket is bolted to the elongate support member. Also the duct bracket include a perforate foot portion, which may be angulated relative to the cylindrical portion of bracket, and which may be secured to the wall of a duct by rivets, for example, passing through the perforations of the foot portion. In the case of the foot portion being angulated relative to the cylindrical portion of the duct bracket, the adaptor at the opposite end of the elongate support member may define a similar or complementary angulation between the thread-defining tubular end portion thereof and the opposite end portion which bolts to the elongate support member. Thus, the angulations of the adaptor and foot portion of the duct bracket provide for angulation of the elongate support member and its connection at respective ends to the horizontal deck or vertical bulkhead surfaces, for example, of the ship. Preferably, the angulation of both the adapter portion and duct bracket is a forty-five degree deviation from straight. Thus, the support or brace will extend at a forty-five degree angle from the vertical or horizontal surface to which the stud member is welded. Further, the duct bracket provides for the foot portion thereof to extend either vertically or horizontally by choosing one of the two possible orientations of the bracket relative the support member.

The support apparatus provided by the present invention is versatile because the component parts thereof may be assembled in a variety of ways to provide vertical and lateral support to a duct, pipe, or other structure in a ship. No on-site welding is required other than the stud welding equipment, which is comparatively small, easily transported and fast to use. The bolted assembly provides for easy rapid installation of supports, and allows future disassembly for replacement or maintenance of the duct or pipe, for example. While being light weight, the present inventive support apparatus is nevertheless strong and rigid in its assembly. Both large scale and fine-dimension incremental adjustment of the position of the supported duct, pipe, or other item is provided by the present invention. Overall, the present inventive support apparatus is cheaper to use than the conventional welded supports and braces. And, in the event a support is incorrectly installed, it can be removed and reinstalled in its proper place, leaving only the small stud welded to the deck or bulkhead of the ship. In most cases, this stud need not be cut off.

DETAILED DESCRIPTION OF THE INVENTION

Figure 1:
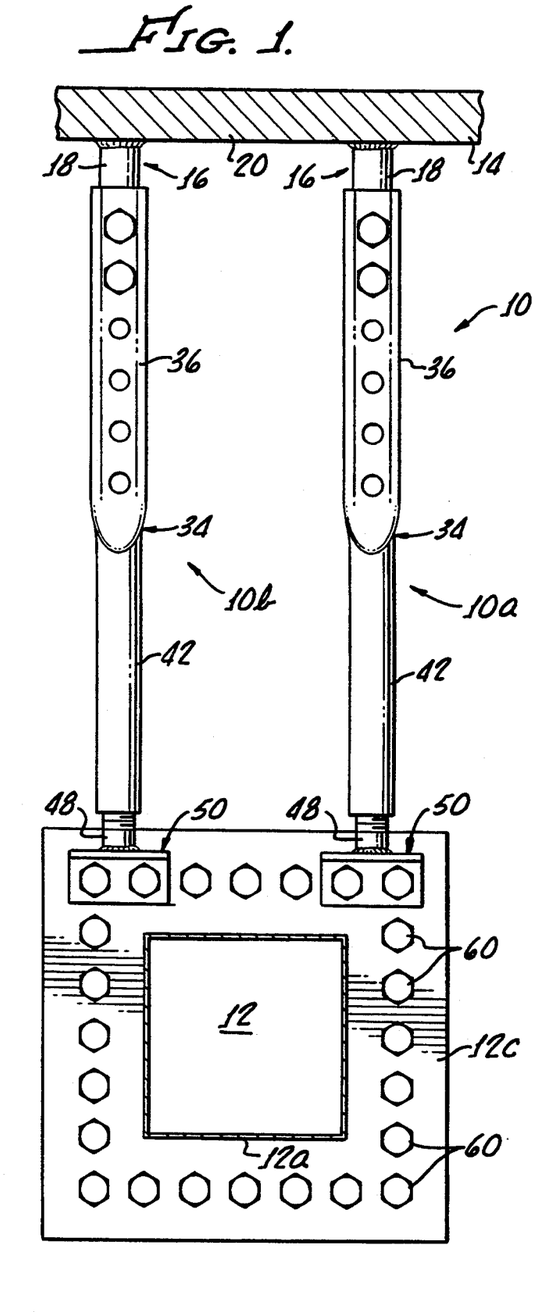
FIG. 1 is a longitudinal elevation view of a duct, seen partially in cross section, and supported by support apparatus embodying the present invention.
Figure 2:
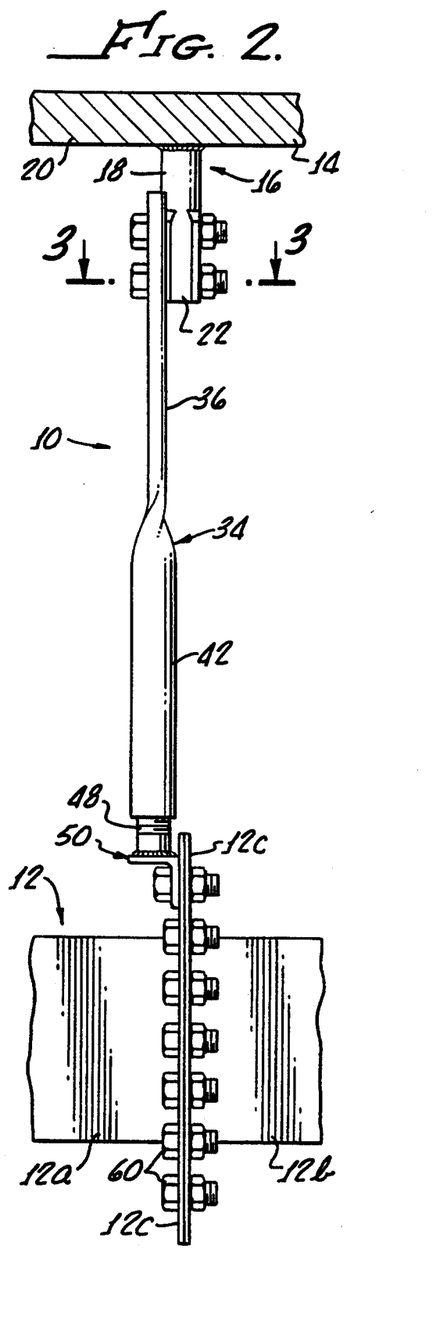
FIG. 2 is a side elevation view of the duct, seen in fragmentary view, and the support apparatus seen in FIG. 1.
Figures 3, 4, 5, 6:
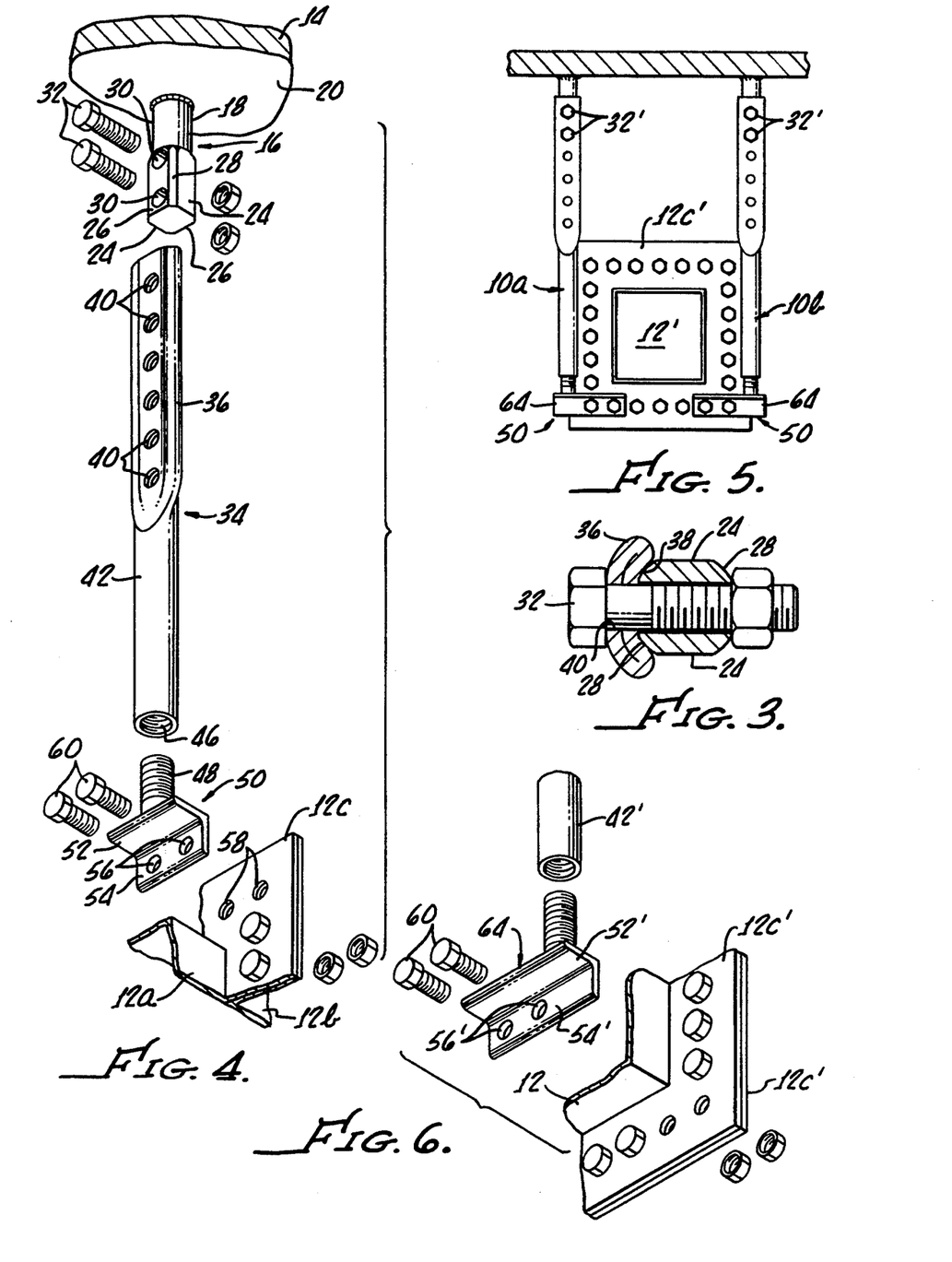
FIG. 3 provides a fragmentary cross-sectional view taken at line 3-3 of FIG. 2, and looking in the direction of the view arrows.
FIG. 4 is a fragmentary exploded assembly perspective view of the support apparatus seen in FIGS. 1-3.
FIG. 5 provides a longitudinal elevation view of support apparatus embodying an alternative embodiment of the invention.
FIG. 6 is a fragmentary exploded assembly perspective view of the support apparatus according to the alternative embodiment of the invention seen in FIG. 5.

As shown in FIGS. 1-4, a support apparatus, generally referenced with the numeral 10, is employed to support a duct 12 vertically below a deck plate 14. The support apparatus includes a pair of similar support assemblies 10a and 10b, which are essentially the same. Consequently, only the one support assembly 10a will be described here, the description of this one assembly sufficing to describe both. The support assembly 10a includes a stud member 16 which is welded to and depends generally perpendicularly below the deck plate 14. As is best seen in FIGS. 2-4, the stud member 16 includes a cylindrical end portion 18 which is welded end-on to the underside surface 20 of the deck plate 14. Those ordinarily skilled in the pertinent arts will recognize that the welding of the stud member 16 to the deck plate 14 can be quickly accomplished with the use of conventional automated welding equipment which includes a stud welding gun or fixture into which the stud member 16 is loaded. Thereafter, the stud gun or fixture is positioned against the surface 20 and a welding cycle is initiated. In this welding cycle, which requires only a few seconds time, the cylindrical end portion 18 of the stud member 16 is precisely and securely welded circumferentially to the surface 20 of the deck plate 14.

At its opposite end, away from the deck plate 14, the stud member 16 includes a prismatic end portion 22. The end portion 22 is generally rectangular in side view, and defines two pairs of opposed side surfaces 24,26. In end or transverse section view, the prismatic end portion 22 is generally square with rounded convex corners 28, viewing particularly FIG. 3. Transecting the prismatic end portion 22 is a pair of spaced apart through fastener holes 30 opening on the side surfaces 26.

Bolted to the prismatic end portion by means of a pair of bolts 32 received through the fastener holes 30 is an elongate tubular support member 34. This support member 34 includes an end portion 36 which in collapsed to be of U-shape in cross section, viewing FIG. 3. This U-shaped end portion 36 of the support member 34 is sized to define a concave side surface 38 into which the prismatic end portion 22 of the stud member 16 nests, viewing FIGS. 3 and 4. Regularly spaced along the end portion 36 is a plurality of through fastener holes 40, which have a spacing matching the spacing of the fastener holes 30. Consequently, the end portion 36 may be cut to provide a support member of a desired length, and will bolt to the prismatic end portion 22 of the stud 16 anywhere in the end portion 36.

An opposite end portion 42 of the support member 34 is cylindrical, and defines an axially extending bore 44 opening on the end of the support member 34, and the lower end portion 46 of which is threaded, viewing particularly FIG. 4. Threaded into the bore portion 46 is a stem portion 48 of a bracket member 50. The stem portion 48 is welded to the remainder of the bracket member 50. The bracket member 50 is angle shaped with an upper horizontal leg 52 carrying the stem portion 48, and a vertical leg 54 defining a pair of spaced apart through fastener holes 56.

Directing attention for a moment once again to the duct 12, it is seen that this duct includes adjoining sections 12a and 12b, each having a respective outwardly extending flange part 12c, best seen in FIG. 2. The flange parts 12c define regularly spaced apart and matching fastener holes 58 (best seen in FIG. 4). Received in these fastener holes 58 are plural fasteners such as bolts 60. Thus, the duct sections 12a and 12b cooperatively define a bolted flange joint therebetween. The spacing of the fastener holes 56 on the bracket member 50 is selected to match the regular spacing of the fastener holes 58 in the duct flanges. Consequently, a pair of adjacent bolts 60 is used to secure the bracket member 50 to the duct 12 at the flange portion 12c, once again viewing FIGS. 1–4 in conjunction.

During installation of the support assembly 10, the duct 12 may be positioned approximately in its desired area for support, and appropriate positions for the studs 16 are determined as well as the appropriate lengths for the support members 34. The support members are cut to length with a view to the large scale incremental adjustment of position afforded by the plural fastener holes 40 of the support member portion 36. After the studs 16 are welded to the deck plate 14, the duct 12 may be hung therefrom with the bolts in holes 30 in place but not tightened. In this condition of the suspended duct, fine-dimension incremental adjustments of position are possible by temporary removal of the bolts from holes 30 and rotation of the support members 34 relative to the stem portions 48 of the bracket members 50. Once the position adjustments have been made, tightening the bolts 32 positively retains the adjustments and provides secure suspension of the duct 12. Alternatively, the duct 12 may already be in place, and the support apparatus 10 may be made to fit.

Turning now to FIGS. 5 and 6 in conjunction, an alternative embodiment of the invention is depicted, which in many respects is similar to the embodiment depicted and described with reference to FIGS. 1–4. Consequently, features of FIGS. 5 and 6 which are analogous in structure or function to that of FIGS. 1–4 are referenced with the same numeral used previously, and having a prime added thereto. In FIGS. 5 and 6, the support assemblies 10a' and 10b' support a duct 12'. These support assemblies are similar in all respects except the respective bracket members 50' thereof are handed. The bracket member 10a has fastener holes 56' which are offset to the right of stem 48' as viewed in FIG. 5, while the bracket member 10b has the corresponding fastener holes offset leftwardly. That is, the support assembly 10a' includes a right-handed bracket member 50' while the support assembly 10b' includes a left-handed bracket member. In FIG. 6, the left-handed bracket member 50' of the support assembly 10b' is seen. With the understanding that the support assemblies 10a' and 10b' differ from one another only in the handedness of their respective bracket members 50', description of one support assembly (10b) will suffice to describe both.

As seen in FIG. 5, the duct 12 includes a bolted flange joint, and the support assemblies 10a' and 10b' are arranged to support the duct by engagement of the bracket members 50' with a lower portion of the flanges 12c'. In order to pass downwardly on each side of the duct 12, the support assemblies 10' are spaced apart by a dimension 62 which is substantially the same as the edge dimension of the flanges 12c' viewing FIG. 5 Viewing FIG. 6, it is seen that the bracket members 50' include a stem portion 48' which is welded to an elongate laterally extending angle portion 64 adjacent to one end thereof. This angle portion 64 includes an upper leg 52' carrying the stem 48', and a lower leg defining a pair of spaced apart fastener holes 56'. As mentioned above, the fastener holes 56' are offset leftwardly with respect to the stem 48'. Consequently, the support assembly 10b passes clear of the duct 12' and extends vertically alongside of this duct. A pair of bolts 60' securing the flanges 12c' also pass through the fastener holes 56' to support the duct from the bracket member 50'.

In use of the support assembly 10' as depicted in FIGS. 5 and 6, installation of the duct 12' is the same as described above with respect to the support assemblies 10. However, by way of example only, when the overhead space in which the duct 12' is installed is crowded, access to the duct for future removal or maintenance may be eased by use of the support assemblies 10'. That is, if a section of the duct 12' is to be removed, and access to the bolts 32' is not easily possible because of the crowded overhead installations, the bolts 60' may be removed from the flanges 12c' and the bracket members 50' may pivoted out of the way from beneath the duct 12' by a rotation of about ninety degrees of the stem portions 48' in the threaded portions 46' of the support members 34'. Thus, the laterally extending angle portion 64' of each bracket member 50' will extend along side of the duct 12' so that the latter may be lowered past these angle portions. This is another illustration of the versatility of the present support apparatus.

Figure 7:
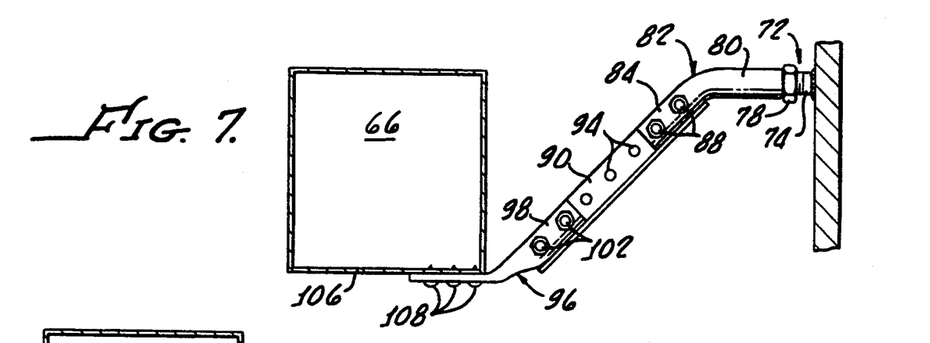
FIG. 7 presents a longitudinal elevation view of support apparatus embodying yet another alternative embodiment of the invention.
Figures 8, 9:
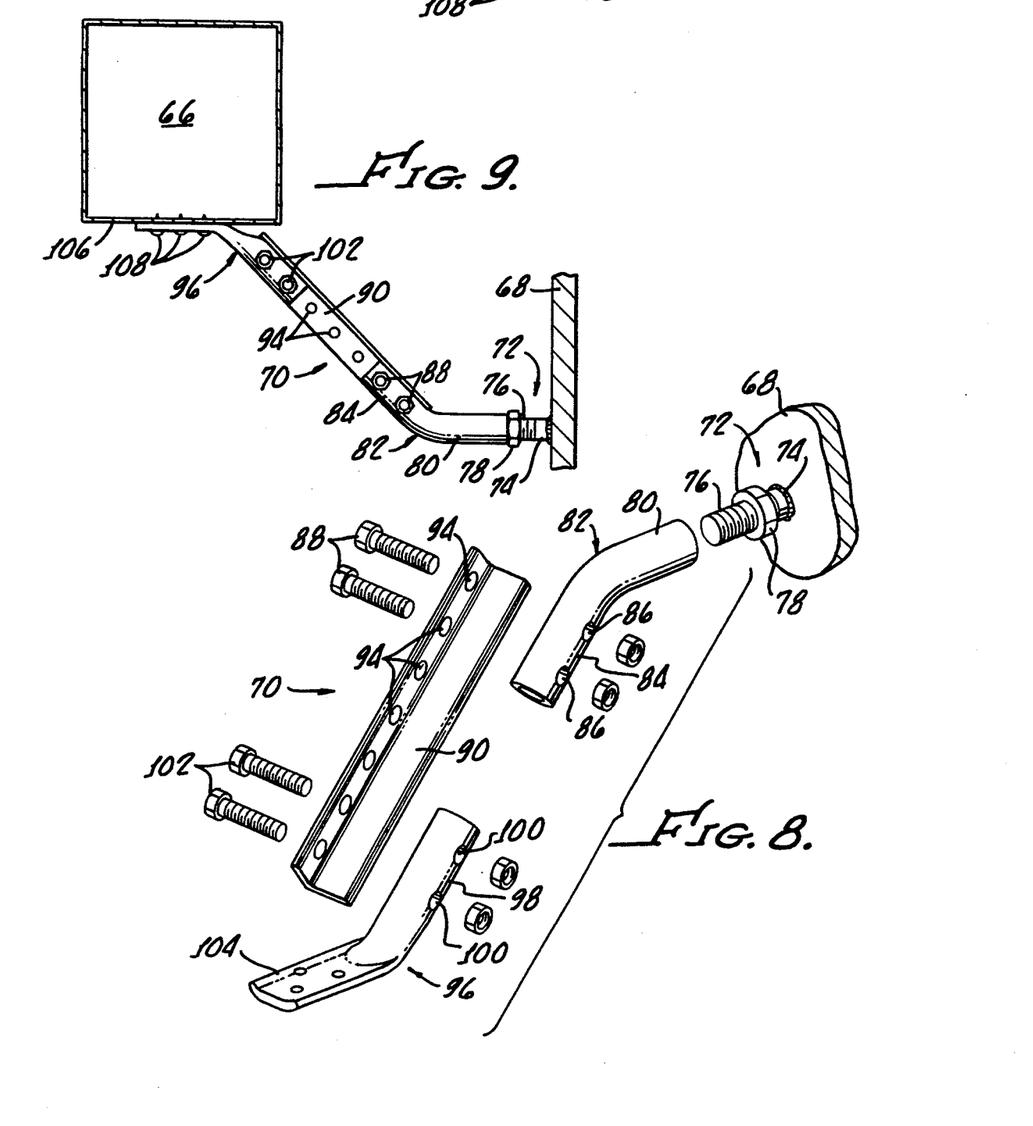
FIG. 8 is an exploded assembly perspective view of the apparatus seen in FIG. 7.
FIG. 9 presents of the support apparatus seen in FIGS. 7 and 8 in another mode of its versatile assembly possibilities.

An alternative embodiment of the invention which may be employed as a brace to provide lateral support to a duct is depicted in FIGS. 7–9. FIGS. 7 and 9 depict the same structural components which are used in alternative modes of installation. Consequently, the same reference numerals are used on both FIGS. 7 and 9 to refer to these same structural components, it being understood that merely the orientation of the components differs between the two Figs. Further, it should be understood that the perspective exploded assembly depiction of FIG. 8 shows these same component parts in the relative orientations they would have when assembled for the mode of installation shown in FIG. 7.

Viewing FIGS. 7–9 in conjunction, a duct 66, which may be fabricated of sheet metal, for example, is laterally supported from an adjacent vertical bulkhead 68 of a ship by means of a laterally and angularly extending support assembly 70 serving to position and brace the duct with respect to side-to-side forces. At the bulkhead 68, the support assembly 70 includes a stud member 72. This stud member 72, similarly to the stud member 16 described above, includes a cylindrical end portion 74 which is welded end-on to the bulkhead 68 so that the remainder of the stud member extends perpendicularly therefrom. Stud member 72 includes an opposite end portion 76 which is threaded. A jam nut 78 is received onto the threaded end portion 76 of the stud member 72. Also threadably received onto the threaded end portion 76 is a tubular end portion 80 of an angulated adaptor member 82. While it is not depicted in the drawing Figures, the tubular end portion 80 of adaptor member 82 is similar to the cylindrical end portion 42 of the elongated support member 34 described above. That is, the adaptor member end portion 80 defines a central threaded bore (not visible in the drawing Figs.) opening on the end thereof and into which the threaded end portion 76 of the stud member 72 threaded.

At its opposite end, the adaptor member 82 includes a cylindrical end portion 84 which is angulated with respect to the end portion 80, and which defines a pair of spaced apart transverse through fastener holes 86. Secured to the end portion 84 by a pair of bolts 88 is an elongate support member 90. The support member 90 is of angle or L-shaped configuration, in end elevation, and includes a leg 92 which defines plural regularly spaced fastener holes 94. The bolts 88 are received through an appropriate pair of the holes 94.

At the duct 66, the support assembly 70 includes a duct bracket member 96. Similarly to the adaptor member 82, the bracket member 96 includes a cylindrical end portion 98 defining a pair of spaced through fastener holes 100. A pair of bolts 102 pass through the holes and through a pair of the holes 94 of the support member 90 to secure these components together. The bracket member 96 includes a perforate foot portion 104 which angulated relative to the cylindrical portion 98. The relative angulations of the adaptor member 82 and of the duct bracket member 96 are substantially the same as depicted. Preferably, both the adapter member 82 and the duct bracket member 96 define angulations of forty-five degrees from straight. Consequently, the duct bracket member 96 may be secured to support member 90 as depicted in FIGS. 7–9 with foot portion 104 extending parallel with the stud 72. Alternatively, the bracket member 96 may be flipped over so that the forty-five degree angulations of the adapter 82 and bracket 96 are additive, and foot portion 104 extends perpendicularly to the stud 72. However, it will be understood that angulations for adapter 82 and bracket member 96 other than forty-five degrees are possible, and that the angulations for these two members need not be the same.

The foot portion 104 of the bracket member 96 is secured to a wall 106 of the duct 66 by fasteners 108, such as rivets, for example. Viewing the FIGS. 7 and 9, it will be seen that the modes of installation therein depicted differ primarily in that the foot portion 104 has its opposite surfaces disposed toward the duct 66. As a consequence, the support member 90 extends alternatively upwardly (FIGS. 7 and 8), or downwardly (FIG. 9), as extends laterally from the duct 66 toward the bulkhead 68. These alternative modes of installation illustrate part of the versatility of the present inventive support apparatus.

By now the reader will well understand that large scale incremental adjustment of the support assembly 70 is provided by the plural fastener holes 94 of the elongate support member 90, any one of which may receive bolts for securement to the adaptor 82 and duct bracket 96. During installation, the support member is simply cut to appropriate length with a view to this large increment adjustment feature. For fine-dimension incremental adjustments, the adaptor member is threadably adjusted on the stud 72. Thus, both large and small increment adjustability is also offered by the support assembly 70 depicted in FIGS. 7–9.

Figures 10, 11, 12:
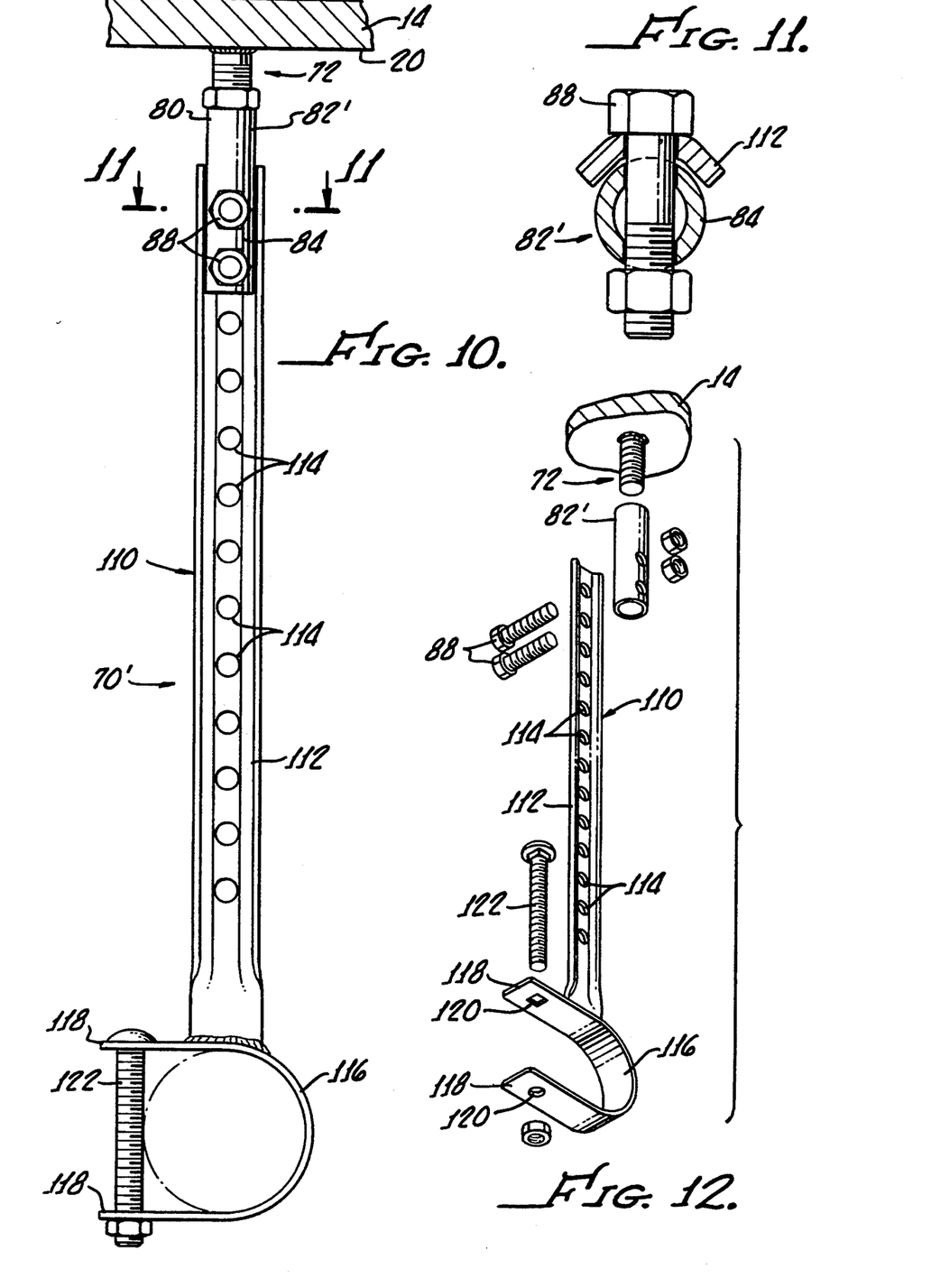
FIG. 10 is an elevation view of support apparatus according to still another alternative embodiment of the invention.
FIG. 11 provides a fragmentary cross-sectional view taken at line 11—11 of FIG. 10, and viewed in the direction of the arrows.
FIG. 12 is a exploded assembly perspective view of the support apparatus seen in FIGS. 10 and 11.

Yet another alternative embodiment of the invention is depicted by FIGS. 10–12. This alternative embodiment further illustrates the versatility of the present inventive support apparatus, in that support of a round-section pipe or duct is provided. Because of the familiarity which the reader will have by now with the depicted structural features, those features which are similar in structure or function to featured depicted and described above will be referenced with the same numeral used previously, and without the use of primes except where a structural distinction needs to be pointed out. Viewing FIGS. 10–12 in conjunction, a stud member 72 welded to and depends from a deck plate 14. The stud member 72 is itself in all respects the same as the stud member 72 described in connection with FIGS. 7–9. However, as used in the installation of FIGS. 10–12, this stud member is secured to an overhead deck. Threadably engaging the stud member 72 is an adaptor member 82′ of a support assembly 70′. The adaptor member 82′ is similar to the member 82 described with reference to FIGS. 7–9, with the exception that the end portions 80 and 84 thereof are not relatively angulated.

However, in contrast to the support assembly 70 of FIGS. 7–9, the support assembly 70′ includes only the adaptor 82′ a duct bracket member 110, and connecting bolts 88. The duct bracket member 110 itself includes an elongate stem portion 112, which defines plural regularly spaced through fastener holes 114. This stem portion secures to the adaptor member 82′ with the bolts 88. Similarly to the end portion 36 of the support member 34 seen in FIGS. 1–4, the stem portion is somewhat U-shaped in cross section both to provide good strength at a light weight, and to receive into the U-shape the cylindrical end portion 84 of the adaptor 82′. At its lower end, the duct bracket member 110 includes a U-shaped stirrup portion 116 into which a round section pipe or duct (shown in phantom in FIG. 10) is receivable. This stirrup portion 116 includes a pair of spaced apart end sections, each referenced with the numeral 118. Each end section 118 defines a respective vertically extending through hole 120. A carriage bolt 122 is received in the holes 120 to capture the duct in the stirrup portion 116.

In use of the support assembly 70′, the stem portion 112 is cut to length to provide large scale incremental adjustment of the supported duct. Similarly to the support assembly 70 of FIGS. 7–9, the support assembly 70 also provides fine-dimension incremental adjustment of the supported duct or pipe by threading rotation of the adaptor 82′ on the stud member 72.

In view of the above, it will be seen that the present invention provides a support apparatus and method whereby a duct, pipe, or other item may be suspended in a ship, and which provides for installation with only minimal welding, bolted assembly, a high degree of versatility in installation and use, easing of maintenance burdens by decreasing the work and time required to take down a section of the supported duct, for example, and both large increment and fine-dimension adjustability of the position of the supported item. The support apparatus is economical to make, faster, inexpensive, light weight, and strong and rigid once installed. Moreover, use of the present inventive support apparatus and method in construction of a ship considerably reduces the cost of installing the overhead ducts, pipes and other items so suspended.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A versatile support apparatus providing both large scale and fine-dimension incremental adjustability of a supported article relative to a supporting surface, said support apparatus including:
   a stud member attached to and extending from said supporting surface;
   an elongate support assembly removable securing to said stud member, said support assembly including an elongate portion defining plural spaced fastener holes therethrough, and a bracket portion securing to said elongate portion and configured to supportingly engage said article;
   said support assembly further including intersecuring means for on the one hand securing to said elongate portion at any one of said plural fastener holes thereof thereby to provide said large scale incremental adjustability of incremental size equal to said regular spacing of said fastener holes, and on the other hand said intersecuring means providing for threading interrelationship of one of said stud member and bracket with said elongate portion to provide said fine-dimension incremental adjustment by relative rotation of said elongate portion and said one of said stud member and bracket member;
   wherein said intersecuring means includes one of said stud member and said bracket member including an elongate threaded end portion, and an elongate tubular portion defining an axial threaded bore threadably receiving said threaded end portion; and
   wherein said stud member includes said threaded end portion, and said intersecuring means further includes an elongate adaptor member at one end thereof defining said elongate tubular portion with said threaded axial bore, and at the opposite end portion thereof said elongate adaptor member defining at least one transverse through fastener hole for securing with a fastener to said elongate portion of said support assembly.

2. The support apparatus of claim 1 wherein said fastener is a bolt.

3. The support apparatus of claim 1 wherein said bracket member also defines at least one transverse through fastener hole for securing with a fastener to said elongate portion of said support assembly at one of said plural through fastener holes thereof.

4. The support apparatus of claim 1 wherein said bracket member weldingly secures to said elongate portion of said support assembly.

5. The support apparatus of claim 4 wherein said elongate portion of said support assembly is of generally U-shape in transverse cross section, and said opposite end portion of said elongate member is of cylindrical shape received into said U-shape.

6. The support apparatus of claim 4 wherein said bracket member includes a generally U-shaped stirrup portion for receiving therein said supported article.

7. The support apparatus of claim 3 wherein said elongate portion of said support assembly is of L-shape in transverse cross section.

8. The support apparatus of claim 3 wherein said bracket member is elongate and includes at one end thereof a flattened foot portion securing to said article.

9. The support apparatus of claim 8 wherein said bracket member includes an opposite end portion defining said at least one transverse fastener hole.

10. A versatile support apparatus providing both large scale and fine-dimension incremental adjustability of a supported article relative to a supporting surface, said support apparatus including:
    a stud member attached to and extending from said supporting surface;
    an elongate support assembly removably securing to said stud member, said support assembly including an elongate portion defining plural regularly spaced fastener holes therethrough, and a bracket portion securing to said elongate portion and configured to supportingly engage said article;
    said support assembly further including intersecuring means for on the one hand securing to said elongate portion at any one of said plural fastener holes thereof thereby to provide said large scale incremental adjustability of incremental size equal to said regular spacing of said fastener holes, and on the other hand said intersecuring mean providing for threading interrelationship of one of said stud member and bracket with said elongate portion to provide said fine-dimension incremental adjustment by relative rotation of said elongate portion and said one of said stud member and bracket member;
    wherein said intersecuring means includes one of said stud member and said bracket member including an elongate threaded end portion, and an elongate tubular portion defining an axial threaded bore threadably receiving said threaded end portion;
    wherein said bracket member includes a respective stem portion which defines said threaded end portion;
    wherein said bracket member is of angle shape in cross section and defines a depending leg securing with a fastener to said article.

11. A versatile support apparatus providing both large scale and fine-dimension incremental adjustability of a supported article relative to a supporting surface, said support apparatus including:

a stud member attached to and extending from said supporting surface;

an elongate support assembly removably securing to said stud member, said support assembly including an elongate portion defining plural regularly spaced fastener holes therethrough, and a bracket portion securing to said elongate portion and configured to supportingly engage said article;

said support assembly further including intersecuring means for on the one hand securing to said elongate portion at any one of said plural fastener holes thereof thereby to provide said large scale incremental adjustability of incremental size equal to said regular spacing of said fastener holes, and on the other hand said intersecuring mean providing for threading interrelationship of one of said stud member and bracket with said elongate portion to provide said fine-dimension incremental adjustment by relative rotation of said elongate portion and said one of said stud member and bracket member;

wherein said intersecuring means includes one of said stud member and said bracket member including an elongate threaded end portion, and an elongate tubular portion defining an axial threaded bore threadably receiving said threaded end portion;

wherein said bracket member includes a respective stem portion which defines said threaded end portion;

wherein said stud member includes a prismatic end portion defining part of said intersecuring means, said prismatic end portion defining at least one transverse fastener hole for securing with a fastener to said elongate portion of said support assembly.

12. A versatile support apparatus providing both large scale and fine-dimension incremental adjustability of a supported article relative to a supporting surface, said support apparatus including:

a stud member attached to and extending from said supporting surface;

an elongate support assembly removably securing to said stud member, said support assembly including an elongate portion defining plural regularly spaced fastener holes therethrough, and a bracket portion securing to said elongate portion and configured to supportingly engage said article;

said support assembly further including intersecuring means for on the one hand securing to said elongate portion at any one of said plural fastener holes thereof thereby to provide said large scale incremental adjustability of incremental size equal to said regular spacing of said fastener holes, and on the other hand said intersecuring mean providing for threading interrelationship of one of said stud member and bracket with said elongate portion to provide said fine-dimension incremental adjustment by relative rotation of said elongate portion and said one of said stud member and bracket member;

wherein said intersecuring means includes one of said stud member and said bracket member including an elongate threaded end portion, and an elongate tubular portion defining an axial threaded bore threadably receiving said threaded end portion;

wherein said bracket member includes a respective stem portion which defines said threaded end portion;

wherein said elongate portion of said support assembly at one end section thereof integrally defines said tubular portion with said axial threaded bore; and wherein said elongate portion of said support assembly is tubular throughout its length, and said elongate portion is collapsed to a generally U-shape in cross section at the opposite end section thereof to define in said opposite end section said plural regularly spaced through fastener holes.

* * * * *